March 4, 1930.    D. J. LA FRANCE    1,749,037
SUPPORT FOR FOUNTAIN PEN HOLDERS
Filed March 1, 1928
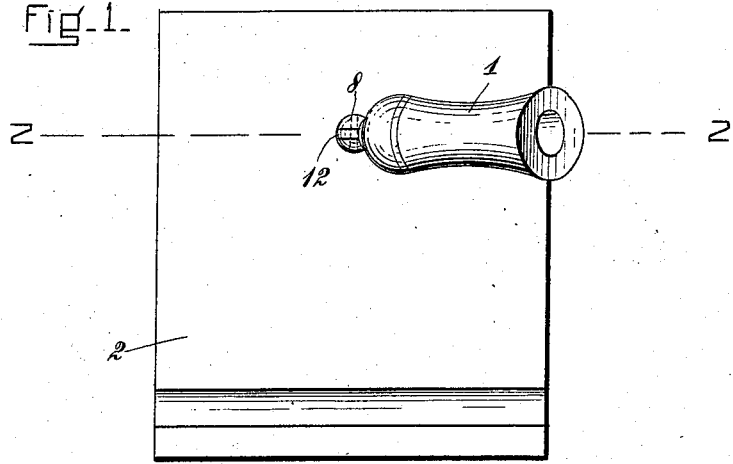
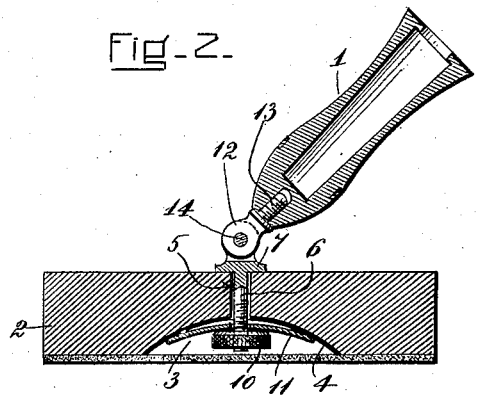
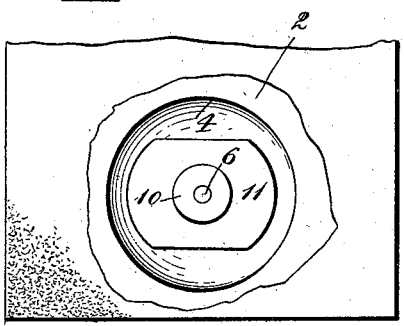
INVENTOR
David J. La France
BY
ATTORNEYS Patented Mar. 4, 1930

1,749,037

UNITED STATES PATENT OFFICE

DAVID J. LA FRANCE, OF CAMBRIDGE, MASSACHUSETTS, ASSIGNOR TO THE CARTER'S INK COMPANY, OF CAMBRIDGE, MASSACHUSETTS, A CORPORATION OF MASSACHUSETTS

SUPPORT FOR FOUNTAIN-PEN HOLDERS

Application filed March 1, 1928. Serial No. 258,173.

The invention relates to an improvement in supports in the nature of a desk support for the holder of a fountain pen.

The object of the invention is to provide an improved means for securing the holder to its supporting base such as will permit the holder being turned to any desired position and maintained in such position.

The invention can best be seen and understood by reference to the drawings in which—

Figure 1 is a plan of the base support with attached holder.

Fig. 2 is a section on the line 2—2 of Fig. 1.

Fig. 3 is a plan of a portion of the under side of the base.

Referring to the drawings:—

1 represents the holder for a fountain pen. This holder may be of any form or type designed to hold the pen when not in use.

2 represents the base support for the holder. This base is in the nature of a weighty block and is designed to rest upon a desk or table. The block is provided with a socket 3 opening from the under side thereof and with a concave wall 4 forming the bottom of the socket. The base is also provided with a hole 5 extending through it from the top surface thereof and opening into the socket.

Secured to the base is a pin having a shank 6, flange 7 and head 8. The shank of the pin is passed downward through the hole 5 in the base with extension into the socket 3 in the base. The flange 7 of the pin, with its shank thus extending, engages the top surface of the base around the hole 5 in it, while the head 8 of the pin rises above the flange and top surface of the base.

Fitting upon the inner end of the shank 6, made threaded and projecting within the socket as aforesaid, is a thumb piece or tightening nut 10. Arranged also upon the shank inside the socket between its concave surface 4 and the nut 10 with ends bearing against said concave surface, is a flat spring 11. On tightening the nut 10 it will be brought to bear against the under side of this spring bending the spring and thereby tensioning it with the effect that the flange 7 of the pin will be drawn hard against the top surface of the base and the nut 10 will also be drawn hard against the under surface of the spring thereby fixing the pin securely in place on the base but with permitted turning on a vertical axis with relation to it, such turning, however, being impeded by the frictional resistance exerted between the flange 7 and the top surface of the base.

The head 8 of the pin is slotted. Fitting to turn within it, on an axis at right angles to the vertical axis of the pin, is a tongue 12 arranged on the end of a shank 13 screw-fitted into the lower end of the holder 1. The tongue 12 is secured to the head of the pin by means of a screw 14 which provides an axis upon which the tongue with attached shank 13 and holder are adapted to turn. The tongue 12 turns upon the head of the pin with more or less frictional impedance and this effect is obtained by binding the separate parts of the head between which the tongue is interposed against the sides of the tongue as the screw 14 is tightened, the metal of the head possessing sufficient elasticity to permit of such tightening.

With the parts thus arranged the holder becomes very securely fixed to the base, but possesses practically a universal movement with relation to it, the pin secured to the base providing a vertical axis of turning and the screw which secures the holder to the head of the pin providing a horizontal axis of turning.

Having thus fully described my invention, I claim and desire to secure by Letters Patent of the United States:—

1. In a support of the swiveling type for the holder of a fountain pen, a base having a socket opening from the under side of the base and presenting a concave surface on its interior, said base having also a hole extending from the top surface thereof into said socket, a pin having a head extending above said base and a shank extending through the hole in the base with extension into the socket therein, said pin having also a flange with frictional bearing against the top surface of the base around the hole in it, a tightening nut on said shank of the pin inside said socket, a flat spring interposed and tensioned between said nut and the concave surface of the socket in the base with the ends of the spring gripping said surface, and means for pivotally mounting said holder on the head of said pin.

2. In a support of the swiveling type for the holder of a fountain pen, a base having a socket opening from the under side of the base, said base having also a hole extending from the top surface thereof into said socket, a pin having a head extending above said base and a shank extending through the hole in the base with extension into the socket therein, said pin having also a flange with frictional bearing against the top surface of the base around the hole in it, a tightening nut on said shank of the pin inside said socket, a spring interposed and tensioned between said nut and the top surface of the socket in the base with the opposite ends of the spring gripping said top surface, and means for pivotally mounting said holder on the head of said pin.

DAVID J. LA FRANCE.